United States Patent
Sivathanu et al.

(10) Patent No.: US 10,474,650 B1
(45) Date of Patent: Nov. 12, 2019

(54) IN-PLACE UPDATES FOR INVERTED INDICES

(71) Applicant: GOOGLE INC., Mountain View, CA (US)

(72) Inventors: Muthian Sivathanu, Bangalore (IN); Saurabh Goyal, Bangalore (IN); Rajiv Mathews, Bangalore (IN)

(73) Assignee: GOOGLE LLC, Mountain View, CA (US)

( * ) Notice: Subject to any disclaimer, the term of this patent is extended or adjusted under 35 U.S.C. 154(b) by 1022 days.

(21) Appl. No.: 14/086,527

(22) Filed: Nov. 21, 2013

Related U.S. Application Data

(60) Provisional application No. 61/827,077, filed on May 24, 2013.

(51) Int. Cl.
   *G06F 16/22* (2019.01)
   *G06F 16/951* (2019.01)
   *G06F 16/953* (2019.01)

(52) U.S. Cl.
   CPC .......... *G06F 16/22* (2019.01); *G06F 16/951* (2019.01); *G06F 16/953* (2019.01)

(58) Field of Classification Search
   CPC .............................................. G06F 17/30622
   USPC .................... 707/741, 999.007, 999.002
   See application file for complete search history.

(56) References Cited

U.S. PATENT DOCUMENTS

| | | | |
|---|---|---|---|
| 6,049,672 A | | 4/2000 | Shiell et al. |
| 6,349,308 B1 * | | 2/2002 | Whang ............ G06F 17/30622 |
| 8,370,315 B1 * | | 2/2013 | Efstathopoulos ... G06F 17/3015 |
| | | | 707/696 |
| 2004/0205044 A1 * | | 10/2004 | Su ..................... G06F 17/30622 |
| 2008/0306949 A1 * | | 12/2008 | Hoernkvist ....... G06F 17/30622 |

FOREIGN PATENT DOCUMENTS

EP   1363189 A2   11/2003

* cited by examiner

*Primary Examiner* — James Trujillo
*Assistant Examiner* — John J Morris
(74) *Attorney, Agent, or Firm* — Brake Hughes Bellermann LLP

(57) ABSTRACT

Implementations provide an indexing system with near-instant updates to an inverted index while maintaining techniques for query optimization. The system may provision empty positions in posting lists to enable in-place updating, without having to rebuild the posting list or append updates to the end of the posting list. For example, a system comprises at least one processor and memory storing an index that includes at least one posting list that maps a term to a set of the documents. The posting list includes an ordered list of documents and has a plurality of open positions within the ordered list. The memory also stores instructions that, when executed by the at least one processor, cause the system to locate an open position of the plurality of open positions for a new document and to insert the new document into the at least one posting list using the open position.

19 Claims, 5 Drawing Sheets

IN-PLACE UPDATES FOR INVERTED INDICES

RELATED APPLICATIONS

This application claims priority under 35 U.S.C. § 119 to Provisional Patent Application Ser. No. 61/827,077, entitled "IN-PLACE UPDATES FOR INVERTED INDEXES" filed on May 24, 2013. The subject matter of this earlier filed application is hereby incorporated by reference.

BACKGROUND

A document search system may index millions of documents associated with a corpus. The index for the search system may be an inverted index that may include posting lists, each posting list representing terms and documents that contain the term. The documents identified in the posting list for a term may be ordered, for example sorted by a document identifier, to assist in locating specific documents within the posting list. In some systems the document identifiers may be assigned based on a rank of the document, so that documents with a higher rank have a lower identifier. The search system may also include other information, such as metadata for the posting lists and documents and/or parsed and encoded document content. In a distributed environment, the index may be divided among various the machines by document, by term, or both. Every day the documents of the corpus may change, and often a document, such as a news organization's home page or a blog, may change several times a day. Re-encoding the posting lists of the index to reflect these changes may be time consuming, but failing to update the index may cause the index to become stale. Appending updates to the end of the posting list can provide an easy and fast method to update the index, but fails to preserve the order of the document identifiers and sacrifices some query optimization techniques, such as the ability to terminate a search early if a minimum number of responsive documents are found.

SUMMARY

Implementations provide an indexing system with near-instant updates to an inverted index while maintaining techniques for query optimization. For example, the system may provision empty positions in posting lists to enable in-place updating of the posting lists, without having to rebuild the posting list or append updates to the end of the posting list. For example, when the system receives an updated document and identifies an inserted term, the system may search the posting list for the term for the closest empty position to the document identifier of the updated document. When the empty position is located, the system may use the empty position to shift the document identifiers currently in the list to allow the new identifier to be inserted in the posting list while preserving the correct order. The document identifiers may be shifted up or down, depending on the location of the empty position and the document identifier to be inserted. The number of empty positions allocated in a posting list may be based on the rate of updates for a particular term, so a term that changes often is provided with more empty positions than a term that rarely receives updates. This allows near-instant updates of the posting lists while preserving the order of the document identifiers in the posting list to maintain efficient query processing.

One aspect of the disclosure can be embodied in a system that includes memory storing an index of documents, the index including at least one posting list that maps a term to a set of the documents. The posting list includes an ordered list of documents that has a plurality of open positions within the ordered list. The system also includes at least one processor and memory storing instructions that, when executed by the at least one processor cause the system to perform operations. The operations may include locating an open position of the plurality of open positions for a new document and inserting the new document into the at least one posting list using the open position. In some implementations, the open positions may be provisioned uniformly.

The system can include one or more of the following features. For example, the operations may also include marking a position of a received document as open to remove the document from the ordered list and/or determining that the plurality of open positions are now filled and re-encode the posting list. As another example, the plurality of open positions may be a first plurality of open positions re-encoding the posting list includes determining a rate of change for the term and provisioning a second plurality of open positions based on an interval that is a function of the rate of change. In a further example, the operations may include receiving a query that includes the term and generating a result that includes a predetermined number of documents from the beginning of the posting list. In some implementations, inserting the new document into the posting list using the open position includes moving existing documents between the open position and the new document, thereby filling the open position. In some implementations, each document has a corresponding identifier and the ordered list is ordered by document identifier. In such an implementation, the open position located has the fewest document identifiers between the open position and a document identifier for the new document.

Another aspect of the disclosure can be embodied in a computer-implemented method that includes generating, using at least one processor, a posting list for a key value. The posting list may match the key value to a set of ordered non-key values, the set of ordered non-key values including a plurality of non-contiguous open positions within the ordered set. The method may also include locating, using the at least one processor, an open position of the plurality of open positions for a new non-key value and inserting, using the at least one processor, the new non-key value into the set of ordered non-key values using the open position.

The method may include one or more of the following features. For example, the method may also include marking a position of one non-key value of the set of non-key values as open to remove the non-key value from the posting list and/or determining that the plurality of open positions are now filled and re-encoding the posting list. As another example, the plurality of open positions is a first plurality of open positions re-encoding the posting list includes determining a rate of change of the posting list and provisioning a second plurality of open positions based on an interval that is a function of the rate of change. In another example, the method can include receiving a query that includes the key value and generating a result that includes a predetermined number of documents from the beginning of the posting list.

In some implementations, inserting the new non-key value includes moving existing non-key values between the open position and the new non-key value, so that the open position becomes filled. In some implementations each non-key value is a document identifier and the key value is a term that occurs in documents that correspond to the set of non-key values and/or the open positions are provisioned uniformly. In some implementations the open position located is a position having the fewest non-key values between the open position and the new non-key value and/or the open position is used to preserve the order of the set when inserting the new non-key value.

Another aspect of the disclosure can be embodied in a computer-implemented method that includes generating, using at least one processor, a posting list for a term, the posting list having a list of documents with content that includes the term, the posting list also including a plurality of open positions spaced throughout the list of documents, filling, using the at least one processor, the plurality of open positions as new documents are added to the posting list; and adding, using the at least one processor, open positions to the posting list as existing documents are deleted from the posting list.

One or more of the implementations of the subject matter described herein can be implemented so as to realize one or more of the following advantages. As one example, an inverted index may be kept updated with near-instant updates while retaining the ability to use a skip table at query time to more quickly locate documents and/or to terminate a search early when a minimum number of responsive documents are found. Furthermore, applying the updates incurs low cost because most updates will find an empty position quite close to the target document and, therefore, the amount of memory accessed and the work done is quite small.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
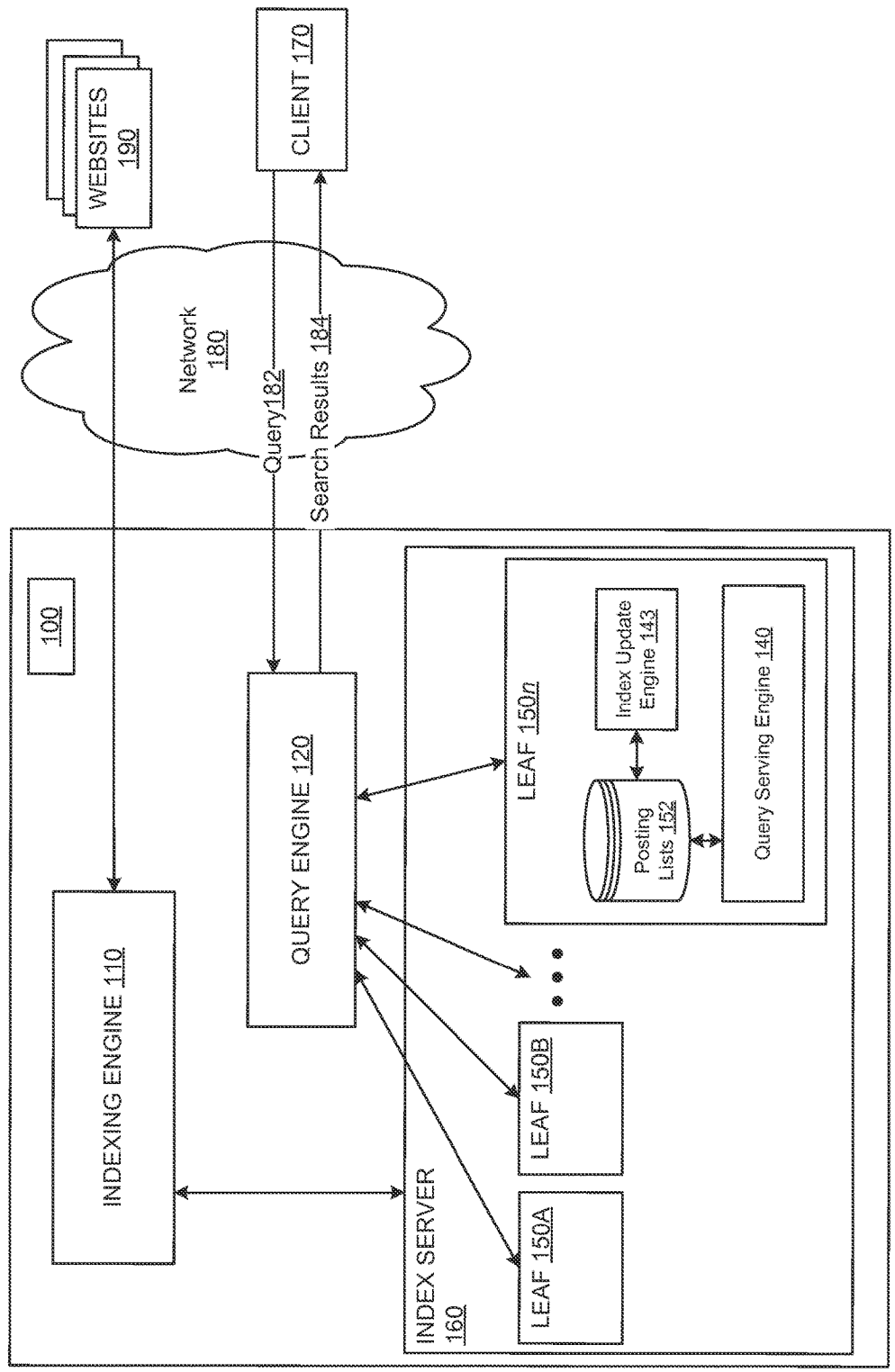
FIG. 1 illustrates an example system in accordance with the disclosed subject matter.
Figure 5:
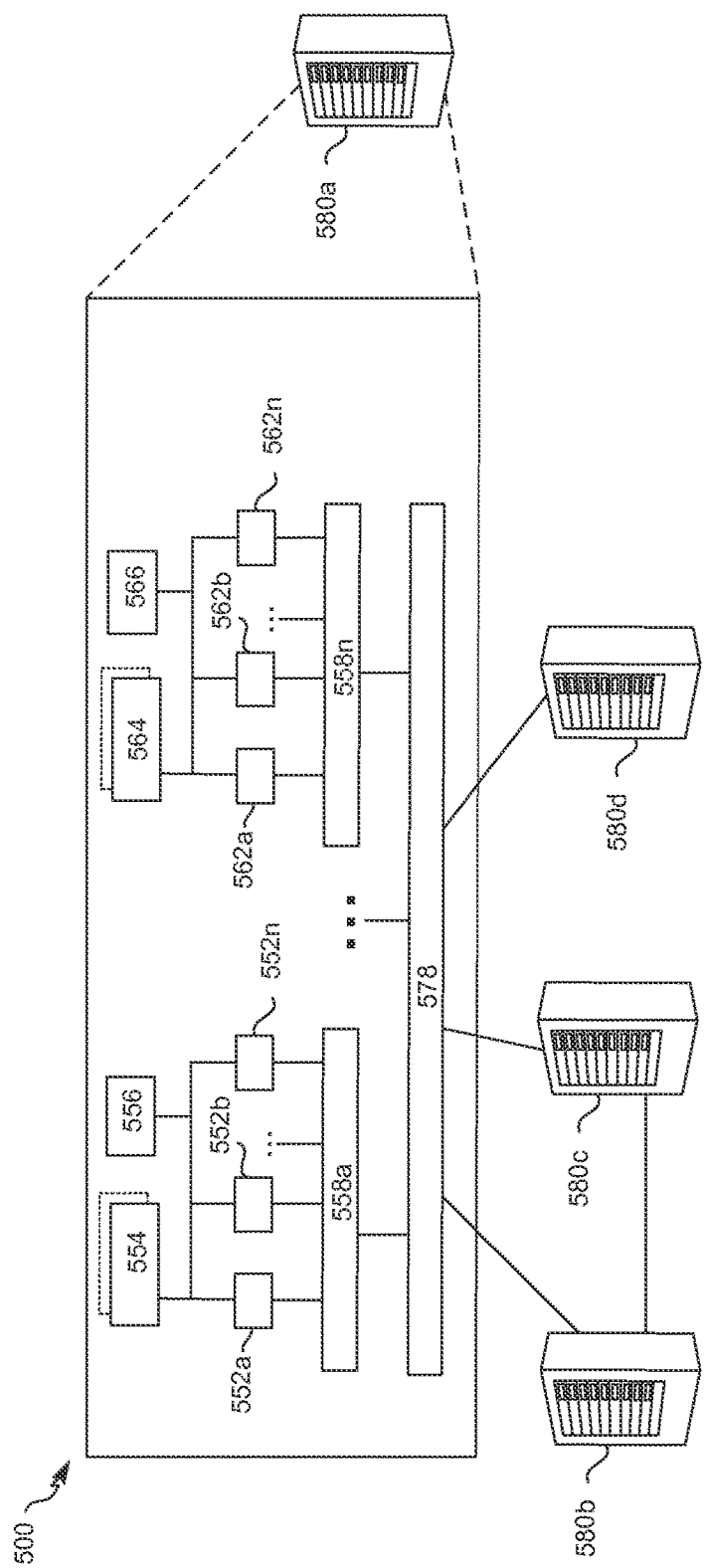
FIG. 5 shows an example of a distributed computer device that can be used to implement the described techniques.

FIG. 1 is a block diagram of a distributed indexing system 100 in accordance with an example implementation. The system 100 may be used to implement a distributed index and search system using the techniques described herein. The depiction of system 100 in FIG. 1 is described as an Internet-based search engine with an inverted index having, by way of example, terms as key-values and lists of document identifiers as non-key values, but the techniques described may be applied to other types of inverted indexes. Documents may include any type of files with content, including web pages, PDF documents, word-processing documents, images, sound files, JavaScript files, etc. Other network configurations and applications of the described technology may be used. For example, the search engine may be used to search local documents, content stored on portable devices, or documents available through other technologies. The search system 100 may receive queries 182 from a client device 170 and return search results 184 in response to the queries. Each query 182 is a request for information. Query 182 can be, for example, text, audio, images, or scroll commands. The search system 100 may include indexing engine 110, query engine 120, and index server 160. Indexing engine 110, query engine 120, and index server 160 may be computing devices that take the form of a number of different devices, for example a standard server, a group of such servers, or a rack server system. In some implementations, indexing engine 110, query engine 120, and index server 160 may be a single system sharing components such as processors and memories. In addition, indexing engine 110 and query engine 120 may be implemented in a personal computer, for example a laptop computer. In some implementations, the indexing engine 110, the query engine 120, and the index server 160 may be distributed systems implemented in a series of computing devices, such as a group of servers. In some implementations, the servers may be organized into a tree structure, with a root server and leaf servers, such as leaf 150A to 150n. In some implementations (not shown), the tree may include intermediate servers, so that there are one or more layers between the root and the leaf servers. The indexing engine 110, the query engine 120, and index server 160, may be examples of computer device 500, as depicted in FIG. 5.

The search system 100 illustrated in FIG. 1 operates over a large corpus of documents, such as the Internet, but can likewise be used in more limited collections, such as a library of a private enterprise. In either context, documents are typically distributed across many different computer systems and sites, for example websites 190. Indexing engine 110 can crawl the contents, for example documents, of the web servers to locate newly added content, deleted content, and modified content. Added content, deleted content, and modified content are considered updates or updated content. When indexing engine 110 identifies updated content, it may send the update, such as update file 130, to the index server 160 and the index server may apply the update to the posting lists 152. In a distributed index, updates from the indexing engine 110 may be distributed amongst one or more leaves, such as leaf 150A to leaf 150n. Each leaf may include an update engine 143 that receives the update from the indexing engine 110 and updates the posting lists 152 on the leaf.

Indexing engine 110 can include one or more processors configured to execute one or more machine executable instructions or pieces of software, firmware, or a combination thereof to create index update files 130. For example, the indexing engine 110 may receive information from websites 190 regarding new, updated, and deleted documents. In a distributed environment, the indexing engine 110 may assign documents obtained from websites 190 to one of leaf 150A to 150n. Websites 190 may be any type of computing device accessible over the Internet. In some implementations, the assignment may be based on a global document identifier, although other criteria can be used. In some implementations the indexing engine 110 may generate one index update file 130 per leaf, so that each leaf receives an update file for the documents assigned to it. In some implementations (not shown) the indexing engine 110 may generate one index update file 130 and the query engine 120 may divide the file into several files, one per leaf. In some implementations, the index update file 130 may also include scoring information for the updated documents as well as other information, such as sort keys and attachment data, etc. In other words, the index update file 130 may include any data or information needed to update a given document on a given leaf, whether deleted, inserted, or updated. Although not shown in FIG. 1 for the sake of brevity, in some implementations, the indexing engine 110 may be one or more separate computing devices.

Like indexing engine 110, query engine 120 may include one or more servers that use the index server 160 to identify search results for queries 182, for example, using conventional or other information retrieval techniques. In some implementations, query engine 120 may also be a root of the distributed index and may include one or more servers that receive queries 182 from a requester, such as client 170. The query engine 120 may also work with index server 160 to identify documents responsive to the query, and provide information from the responsive documents as search results 184 to the requester. The query engine 120 may include a ranking engine that calculates scores for the documents responsive to the query, for example, using one or more ranking signals. The ranking engine may rank the documents found responsive to the query using the scores.

System 100 may also include an index server 160. Index server 160 may be a collection of distributed computing devices each with its own processor and memory. The number of computing devices that comprise index server 160 can vary. The index server 160 may be divided into one or more leaf nodes, such as leaf 150A, leaf 150B, leaf 150n, with n representing any integer. A leaf node may be a logical division of documents in the corpus, with each document being assigned to a leaf node. Thus, a leaf node may correspond to one computing device, or a leaf node may be a logical computing device and may share a physical computing device with other leaves. In some implementations, a document's assigned leaf may change when the document is updated, making leaf assignments flexible. The query engine 120 may route query requests to the leaf nodes and act as the primary means of communication between the leaves at query serving time. In addition to the leaf nodes, the index server 160 may include one or more layers of nodes between the query engine 120 and the leaf nodes, but are not shown in FIG. 1 for the sake of brevity. Thus, for example, an intermediate node may be associated with, for example, 20 leaf nodes. The intermediate node may be connected directly to the query engine 120, or there may be one or more additional layers between the intermediate node and the query engine 120. Thus, although FIG. 1 shows communications directly between the query engine 120 and leaf nodes, it is to be understood that intermediate node(s) may be used to direct communications and aggregate results using known methods, such as remote procedure calls. In some implementations, the query engine 120, intermediate, and leaf nodes that make up the tree may, collectively, be referred to as the index. In some implementations, the posting lists, collectively, may be referred to as the index.

Each of the leaf nodes that make up index server 160 can include posting lists 152. The posting lists 152 may be stored in memory configured to store one or more pieces of data, either temporarily, permanently, semi-permanently, or a combination thereof. The memory may include any type of storage device that stores information in a format that can be read and/or executed by a processor, including volatile memory, non-volatile memory, or a combination thereof. Each leaf 150 may also include documents, document metadata, and other information. The documents may be processed, encoded, and scored information for documents from websites 190, rather than a copy of the actual documents from the websites 190. Posting lists 152 may generally represent terms appearing in the documents.

The posting lists 152 may be stored in fast-access memory, such as RAM, flash, cache, etc., to minimize query latency, or may be stored, e.g., on disk. Terms may be single words, n-grams, multiple word phrases, or other word patterns; and likewise document properties such as restricts (e.g., "is_English", can be treated like a term). Posting lists 152 may be provisioned with open positions in the document identifier portion, or non-key portion, of a posting list. In some implementations the open positions may be provisioned and uniformly spaced within the document identifier list at the time a particular posting list is generated. In some implementations the open positions may be provisioned non-uniformly so that portions of the posting list where modifications are expected to be frequent have more frequent open positions than portions of the posting list without an expectation of frequent change. The open positions may be filled as documents are added to the list. Removing a document from the posting list may generate a new open position. Posting lists 152 may support in-place updates, or instant updates. An in-place update or instant update refers to an update that does not take place in a batched manner. In other words, an instant update occurs close in time to the discovery of the updated document by the indexing engine 110, rather than once or twice a day.

Indexing engine 110 may be in communication with websites 190 and query engine 120 may be in communication with client(s) 170 over network 180. The network 180 may be for example, the Internet or the network 180 can be a wired or wireless local area network (LAN), wide area network (WAN), etc., implemented using, for example, gateway devices, bridges, switches, and/or so forth. Via the network 180, the indexing engine 110 and the query engine 120 may communicate with and transmit data to/from websites 190 and clients 170.

Figure 2:
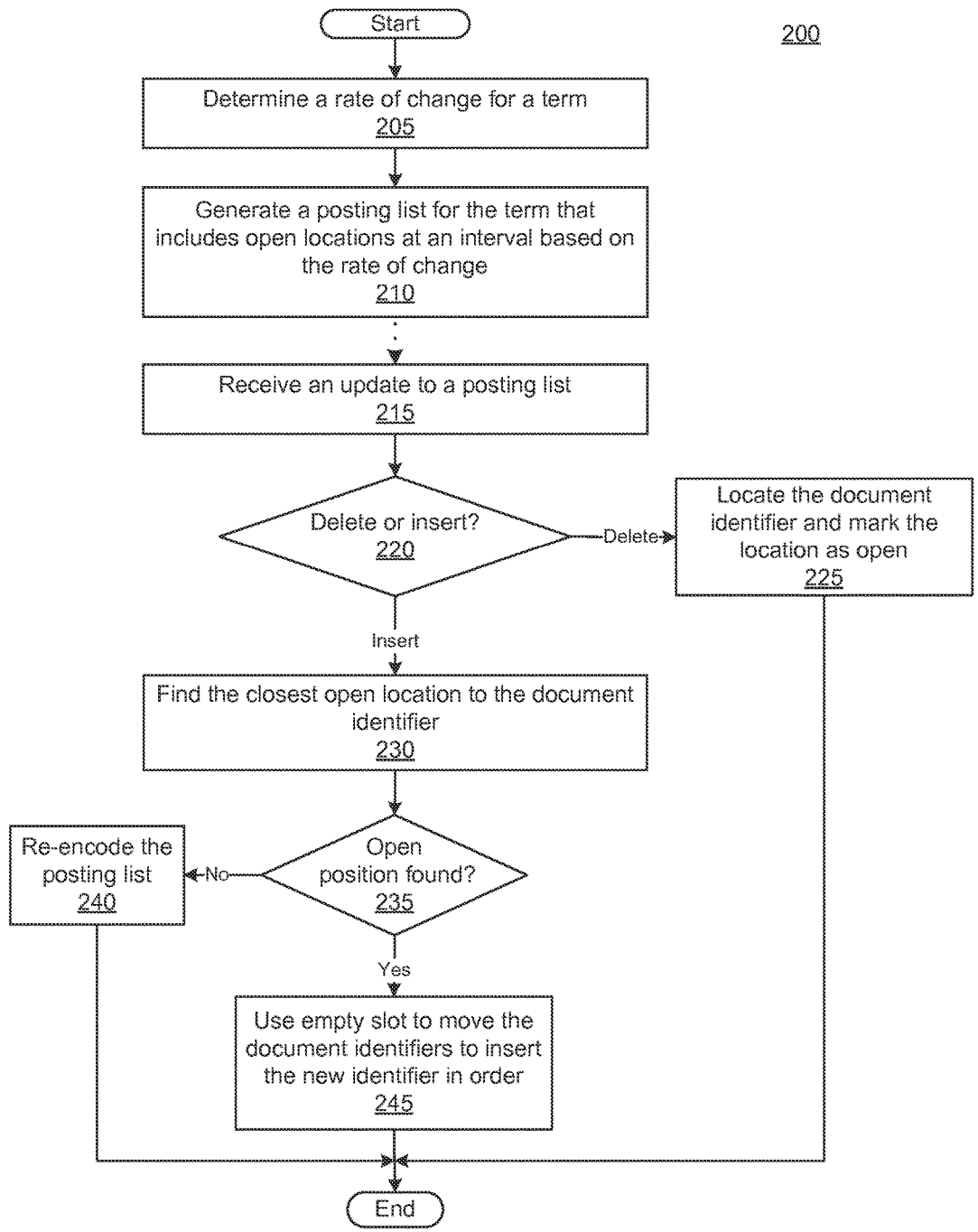
FIG. 2 illustrates an example flow diagram of updating an inverted index in-place, according to an implementation.
Figure 3:
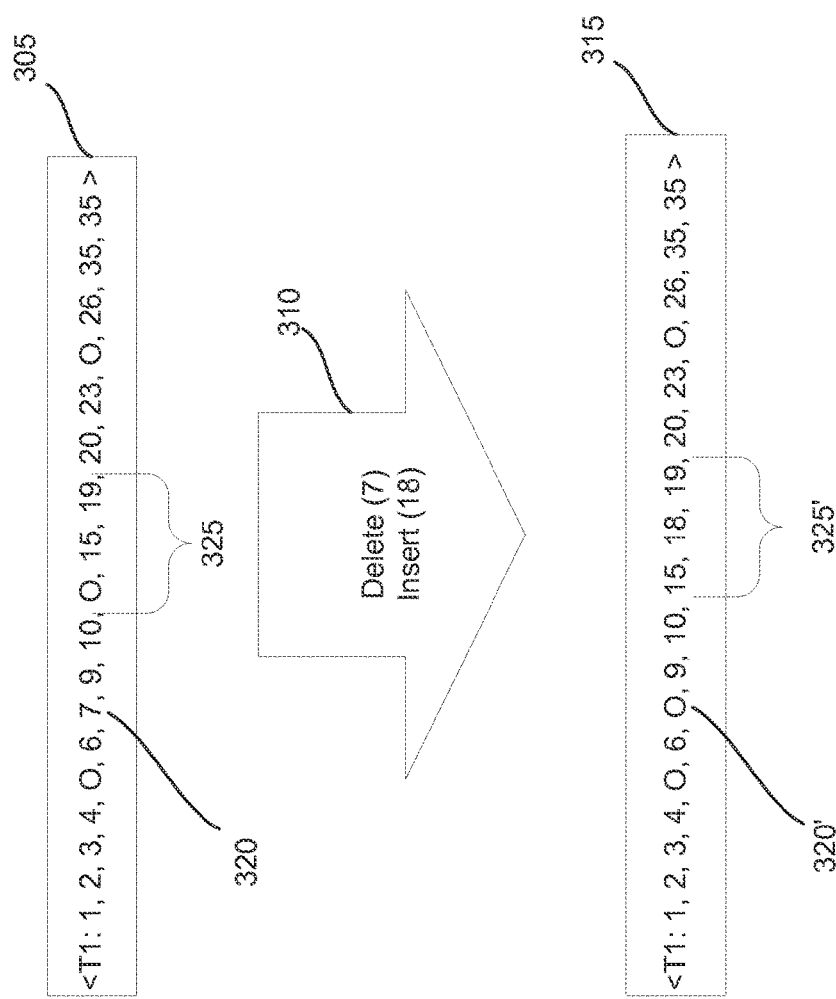
FIG. 3 illustrates an example of an in-place update of a posting list, according to an implementation.

FIG. 2 illustrates an example flow diagram of process 200 for updating an inverted index in-place. The process 200 shown in FIG. 2 may be performed by a search system and, at least in part, by an index update engine, such as index update engine 143 shown in FIG. 1. Process 200 shown in FIG. 2 may include two phases; a re-encode phase and an in-place update phase. During the re-encode phase the system may generate or regenerate a posting list for a particular term. As part of the re-encode phase the system may determine a rate of change for the term (205). In some implementations, the rate of change may be the same for all posting lists. In some implementations, the rate of change may be specific to the term. For example, the system may track the number of updates that occur to the posting list of the term over time. In some implementations, terms meeting a popularity threshold may have a term-specific rate of change while the remaining terms have a set rate of change. Terms that appear in many documents, such as "the," may have a very high rate of change while terms that appear in only a few documents may rarely change. The system may generate a posting list for the term that includes a number of open positions. The number of open positions may be based on the rate of change, so that terms with a high rate of change have open positions at a frequent interval. For example every fifth position may be an open position for a term with a high rate of change. Likewise, a term that changes less frequently may have a posting list where every hundredth position is an open position. The interval at which an open position appears may be a function of the rate of change for the term. In some implementations, if the rate of change falls below a threshold the posting list may have one open position. Of course, as new documents are added, some documents are deleted, so the open positions may not remain a function of change rate. Additionally, in some implementations the open positions may be provisioned at a predetermined fixed interval unrelated to the rate of change. Item 305 of FIG. 3 illustrates an example of a posting list for term T1 with an interval of five, so that every fifth position is an open position.

As indicated above, a posting list can be a list of document identifiers associated with a term. In some implementations, a position is an open position when it contains information that is not a valid document identifier. For example, an open position may be marked as open position using a data structure, metadata, or some other method. In some implementations, an open position is any position with a predetermined value, such as low values, all zeros, high values, or some other value that is not a valid document identifier. In some implementations open positions may begin with a special character. Other methods of marking a position as open may be used. Once the posting list for the term has been generated with open positions occurring at an interval, the re-encoding phase of process 200 ends for the term, and the posting list is ready to begin the in-place update phase. Although not illustrated in FIG. 2, the system may perform the re-encoding phase for other terms and may perform the re-encoding phase for multiple terms concurrently.

The in-place update phase may begin when the system receives an update to the posting list (215). As indicated above, the update may be a deletion of a document identifier or an insertion of a document identifier. In some implementations, the update may include an update to metadata associated with the posting list positions. For example, each position in the posting list may have associated metadata. In some implementations the metadata may be of fixed size. The update may include replacement metadata for one or more positions of the posting list. If the change is a delete (220, Delete), the system may locate the document identifier to be deleted in the posting list and mark the location as open (225). For example, the system may change the first character of the document identifier to be deleted to a predetermined character, may change the document identifier to a predetermined identifier that marks a position as open, or may set a flag in a table, database, or other data structure. Once the position has been marked as open, process 200 ends for the update. Of course, the system may process additional updates (e.g., additional document identifiers for the term or for another term).

If the update is an insert (220, Insert), the system may search the posting list for an open location (230). Once an open position is located (235, Yes), in some implementations, the system may insert the document identifier into the open position. In some implementations, the document identifiers may be stored in the posting list in an order, for example from lowest to highest. For example, to optimize intersections of the posting lists, the system 100 may include a skip table that indicates the starting byte position within the posting list of a particular document identifier. When the document identifiers are stored in order, the skip table allows the query engine to skip to a particular location within the posting list to determine whether a specific document identifier exists. Without the skip table the query engine may read the posting list starting at the first byte. In some implementations, the assignment of a document identifier may be based on one or more properties of a document, for example the quality of a document, the source of a document, etc. In such an implementation, the system may leave gaps in the document identifier space so that new documents can be assigned a reasonably correct identifier.

In implementations where the document identifiers are ordered, the system may search for an open position located closest to where the document identifier should fall within the ordered document identifiers in the posting list. In such implementations, the system may use the open position to reposition the existing document identifiers to make room for the document identifier to be inserted (245). For example, if document identifiers are in lowest to highest order and the open position is in a position that falls before the document identifier to be inserted, the existing document identifiers are moved down the list until the document identifier to be inserted can be placed in the sorted list in the appropriate location. Likewise, if the open position is a position that falls after the document identifier to be inserted, the existing document identifiers are moved up in the list to make room for the document identifier to be inserted at the appropriate location to preserve the sort order. If a moved document identifier falls on a boundary of the skip table, the system may update the skip table after repositioning the document identifiers. Process 200 then ends, having updated the posting list in place. Of course, the system may continue to process additional updates.

As the system populates open positions with the in-place updates, the posting list may become full. In this situation, the system may not be able to find an open position for an insert (235, No). Thus, the system may re-encode the posting list (240) to provision additional open positions to accommodate additional in-place updates. Re-encoding may include steps 205 and 210 discussed above. Re-encoding the posting list may take into account the recent activity for the posting list, so that the rate of change for the term reflects the recent activity that filled the posting list. Thus, if a term suddenly becomes popular and used in more documents, the system may increase the number of open positions in the posting list, as a function of the new rate of change for the term. Accordingly, the re-encoded posting list may include a different interval for the open positions than a prior posting list may have had.

FIG. 3 illustrates an example of an in-place update of a posting list, according to an implementation. In the example of FIG. 3, the posting list for a term T1, i.e., key value, is illustrated before an update at 305 and after the update at 315. In the example of FIG. 3 an "O" in the list of document identifiers, the non-key values, represents an open position. The system may receive an update 310 to the posting list. The update 310 may include one or more document identifiers to be deleted, and one or more document identifiers to be inserted. In the example of FIG. 3, there is one document identifier to be deleted and one to be inserted. The system may locate the document identifier to be deleted at position 320 in the posting list. Once the identifier is located, the system may mark that position as open, as identified by position 320' illustrated in the updated posting list 315.

Likewise, for the insert the system may locate an open position that is closest to the document identifier to be inserted, namely document 18, and make room of the document identifier in the posting list. For example, the system may shift document identifier 15 down one position, allowing the system to insert document identifier 18 into the posting list while preserving the sort order of the document identifiers, so that the posting list has the document identifiers 10, 18, and 19 in order after the insert. Similarly, if a later update included an insert for document identifier 22, the system may move document identifier 23 up one position and insert the document identifier 22 in order, so that the updated posting list will have identifiers 20, 22, and 23 in a row. Although not shown in FIG. 3, in some implementations, the system may locate a first open position and put a document identifier to be inserted into the first open position located.

Figure 4:
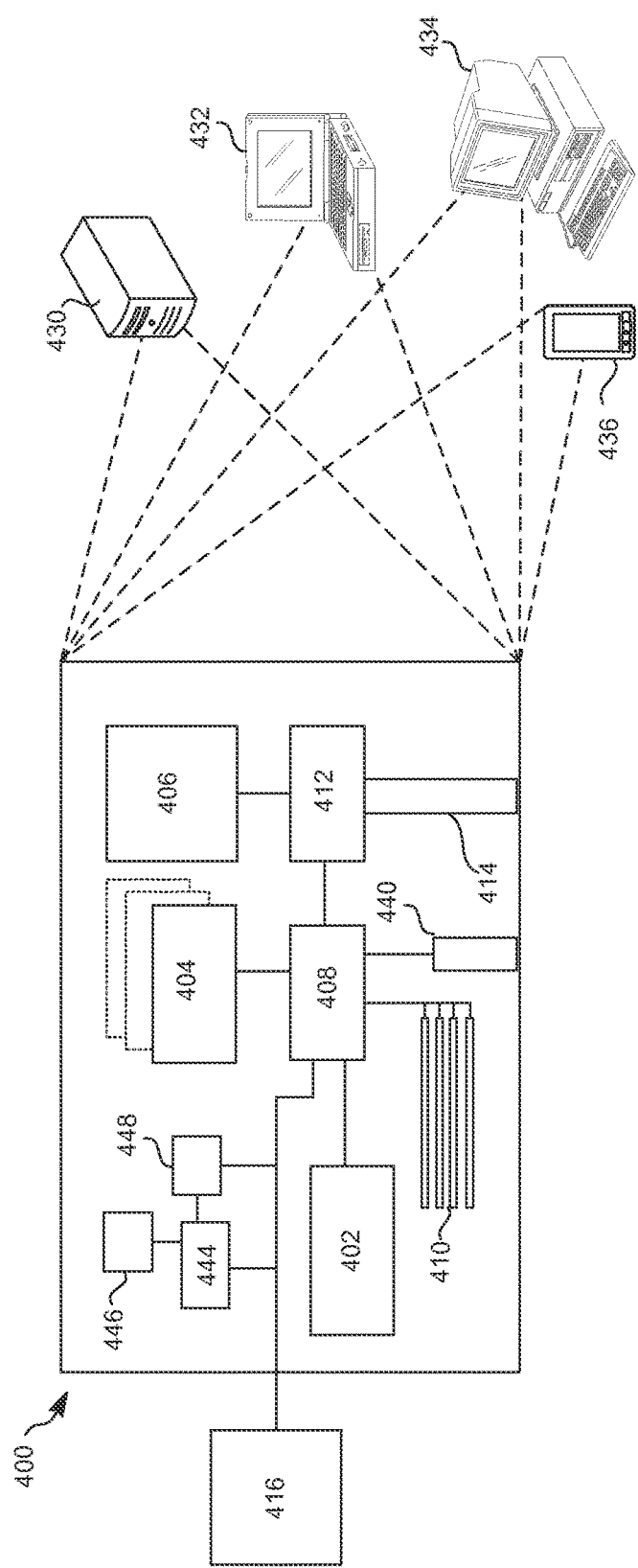
FIG. 4 shows an example of a computer device that can be used to implement the described techniques.

FIG. 4 shows an example of a generic computer device 400, which may be system 100, client 170, and/or a host of websites 190 of FIG. 1, which may be used with the techniques described here. Computing device 400 is intended to represent various example forms of computing devices, such as laptops, desktops, workstations, personal digital assistants, cellular telephones, smart phones, tablets, servers, and other computing devices, including wearable devices. The components shown in FIG. 4, their connections and relationships, and their functions, are meant to be exemplary only, and are not meant to limit implementations of the inventions described and/or claimed in this document.

Computing device 400 includes a processor 402, memory 404, a storage device 406, and expansion ports 410 connected via an interface 408. In some implementations, computing device 400 may include transceiver 446, communication interface 444, and a GPS (Global Positioning System) receiver module 448, among other components, connected via interface 408. Device 400 may communicate wirelessly through communication interface 444, which may include digital signal processing circuitry where necessary. Each of the components 402, 404, 406, 408, 410, 440, 444, 446, and 448 may be mounted on a common motherboard or in other manners as appropriate.

The processor 402 can process instructions for execution within the computing device 400, including instructions stored in the memory 404 or on the storage device 406 to display graphical information for a GUI on an external input/output device, such as display 416. Display 416 may be a monitor or a flat touchscreen display. In some implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk. In some implementations, the memory 404 may include expansion memory provided through an expansion interface.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 404, the storage device 406, or memory on processor 402.

The interface 408 may be a high speed controller that manages bandwidth-intensive operations for the computing device 400 or a low speed controller that manages lower bandwidth-intensive operations, or a combination of such controllers. An external interface 440 may be provided so as to enable near area communication of device 400 with other devices. In some implementations, controller 408 may be coupled to storage device 406 and expansion port 414. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 430, or multiple times in a group of such servers. It may also be implemented as part of a rack server system. In addition, it may be implemented in a personal computer such as a laptop computer 422, or smart phone 436. An entire system may be made up of multiple computing devices 400 communicating with each other. Other configurations are possible.

FIG. 5 shows an example of a generic computer device 500, which may be system 100 of FIG. 1, which may be used with the techniques described here. Computing device 500 is intended to represent various example forms of large-scale data processing devices, such as servers, blade servers, datacenters, mainframes, and other large-scale computing devices. Computing device 500 may be a distributed system having multiple processors, possibly including network attached storage nodes, that are interconnected by one or more communication networks. The components shown here, their connections and relationships, and their functions, are meant to be exemplary only, and are not meant to limit implementations of the inventions described and/or claimed in this document.

Distributed computing system 500 may include any number of computing devices 580. Computing devices 580 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 580a includes multiple racks 558a-558n. Each rack may include one or more processors, such as processors 552a-552n and 562a-562n. The processors may include data processors, network attached storage devices, and other computer controlled devices. In some implementations, one processor may operate as a master processor and control the scheduling and data distribution tasks. Processors may be interconnected through one or more rack switches 558, and one or more racks may be connected through switch 578. Switch 578 may handle communications between multiple connected computing devices 500.

Each rack may include memory, such as memory 554 and memory 564, and storage, such as 556 and 566. Storage 556 and 566 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 556 or 566 may be shared between multiple processors, multiple racks, or multiple computing devices and may include a computer-readable medium storing instructions executable by one or more of the processors. Memory 554 and 564 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 554 may also be shared between processors 552a-552n. Data structures, such as an index, may be stored, for example, across storage 556 and memory 554. Computing device 500 may include other components not shown, such as controllers, buses, input/output devices, communications modules, etc.

An entire system, such as system 100, may be made up of multiple computing devices 500 communicating with each other. For example, device 580a may communicate with devices 580b, 580c, and 580d, and these may collectively be known as system 100. As another example, system 100 of FIG. 1 may include one or more computing devices 500 as indexing engine 110, a separate computing device 500 as query engine 120, and one or more computing devices 500 as index server 160. Furthermore, some of the computing devices may be located geographically close to each other, and others may be located geographically distant. The layout of system 500 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A system comprising:
   memory storing an index of documents, the index including at least one posting list that maps a term to a set of the documents, the posting list including an ordered list of documents in a sorted order and having a plurality of open positions within the ordered list, wherein the open positions are provisioned uniformly;
   at least one processor; and
   memory storing instructions that, when executed by the at least one processor cause the system to:
   locate an open position of the plurality of open positions for a new document, the open position being, of the plurality of open positions, closest to a position that preserves the sorted order of the list, and
   insert the new document into the at least one posting list using the open position.

2. The system of claim 1, wherein the system further has memory storing instructions that, when executed by the at least one processor, further cause the system to:
   mark a position of a received document as open to remove the document from the ordered list.

3. The system of claim 1, wherein the system further has memory storing instructions that, when executed by the at least one processor, further cause the system to:
   determine that the plurality of open positions are now filled; and
   re-encode the posting list.

4. The system of claim 3, wherein the plurality of open positions is a first plurality of open positions re-encoding the posting list includes:
   determining a rate of change for the term; and
   provisioning a second plurality of open positions based on an interval that is a function of the rate of change.

5. The system of claim 1, wherein the system further has memory storing instructions that, when executed by the at least one processor, further cause the system to:
   receive a query that includes the term; and
   generate a result that includes a predetermined number of documents from the beginning of the posting list.

6. The system of claim 1, wherein inserting the new document into the posting list using the open position includes moving existing documents between the open position and the new document, thereby filling the open position.

7. The system of claim 1, wherein each document has a corresponding identifier and the ordered list is ordered by document identifier.

8. The system of claim 7, wherein the open position located has the fewest document identifiers between the open position and a document identifier for the new document.

9. A computer-implemented method comprising:
   generating, using at least one processor, a posting list for a key value, the posting list matching the key value to a set of ordered non-key values in a sorted order, the set of ordered non-key values including a plurality of non-contiguous open positions within the ordered set;
   locating, using the at least one processor, an open position of the plurality of open positions for a new non-key value, the open position being, of the plurality of open positions, closest to a position that preserves the sorted order of the set of non-key values; and
   inserting, using the at least one processor, the new non-key value into the set of ordered non-key values using the open position.

10. The method of claim 9, further comprising:
marking a position of one non-key value of the set of non-key values as open to remove the non-key value from the posting list.

11. The method of claim 9, further comprising:
determining that the plurality of open positions are now filled; and
re-encoding the posting list.

12. The method of claim 11, wherein the plurality of open positions is a first plurality of open positions re-encoding the posting list includes:
determining a rate of change of the posting list; and
provisioning a second plurality of open positions based on an interval that is a function of the rate of change.

13. The method of claim 9, further comprising:
receiving a query that includes the key value; and
generating a result that includes a predetermined number of documents from the beginning of the posting list.

14. The method of claim 9, wherein inserting the new non-key value includes moving existing non-key values between the open position and the new non-key value, so that the open position becomes filled.

15. The method of claim 9, wherein each non-key value is a document identifier and the key value is a term that occurs in documents that correspond to the set of non-key values.

16. The method of claim 9, wherein the open positions are provisioned uniformly.

17. The method of claim 9, wherein the open position located is a position having the fewest non-key values between the open position and the new non-key value.

18. The method of claim 9, wherein the open position is used to preserve the order of the ordered set when inserting the new non-key value.

19. A computer-implemented method comprising:

generating, using at least one processor, a posting list for a term, the posting list having a list of identifiers for documents with content that includes the term, the identifiers being in a sorted order within the posting list for the term and the posting list also including a plurality of open positions spaced throughout the list of identifiers;

filling, using the at least one processor, the plurality of open positions as new identifiers are added to the posting list to preserve the sorted order; and adding, using the at least one processor, open positions to the posting list as existing identifiers are deleted from the posting list.

* * * * *